United States Patent
Ushiyama et al.

(10) Patent No.: US 6,218,748 B1
(45) Date of Patent: Apr. 17, 2001

(54) ROTATION DETECTING DEVICE FOR A BRUSHLESS MOTOR

(75) Inventors: Kiyohiko Ushiyama; Isao Ushikoshi, both of Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 08/442,532

(22) Filed: May 16, 1995

(30) Foreign Application Priority Data

May 17, 1994 (JP) .................................................. 6-126981

(51) Int. Cl.$^7$ .................................................. H02K 11/00
(52) U.S. Cl. .......................................... 310/68 B; 310/156
(58) Field of Search ............................................... 310/68 R

(56) References Cited

U.S. PATENT DOCUMENTS

| | | | |
|---|---|---|---|
| 4,902,923 | * | 2/1990 | Okauchi ................................ 310/268 |
| 5,319,270 | * | 6/1994 | Tanaka et al. ....................... 310/67 R |
| 5,408,153 | * | 4/1995 | Imai et al. ........................... 310/68 B |
| 5,410,201 | * | 4/1995 | Tanaka et al. ....................... 310/68 B |

* cited by examiner

*Primary Examiner*—Nestor Ramirez
*Assistant Examiner*—Karl I. Tamai
(74) *Attorney, Agent, or Firm*—Sughrue, Mion, Zinn, Macpeak & Seas, PLLC

(57) ABSTRACT

A rotation detecting device for a brushless motor having: a stator core on which a coil is wound; a driving magnetic pole portion which opposes the stator core, which comprises a plurality of magnetic poles, and which is rotated; an FG magnetized portion which is rotated together with the driving magnetic pole portion and which comprises a plurality of magnetic poles; and an FG pattern which opposes the FG magnetized portion. In the device, relative positions of the stator core, the driving magnet pole portion, the FG magnetized portion, and the FG pattern in the circumferential direction are set so that the minimum point c of a torque ripple of the brushless motor does not coincide with points a and b of an output signal from the FG pattern which function as a trigger for rotation control.

4 Claims, 5 Drawing Sheets

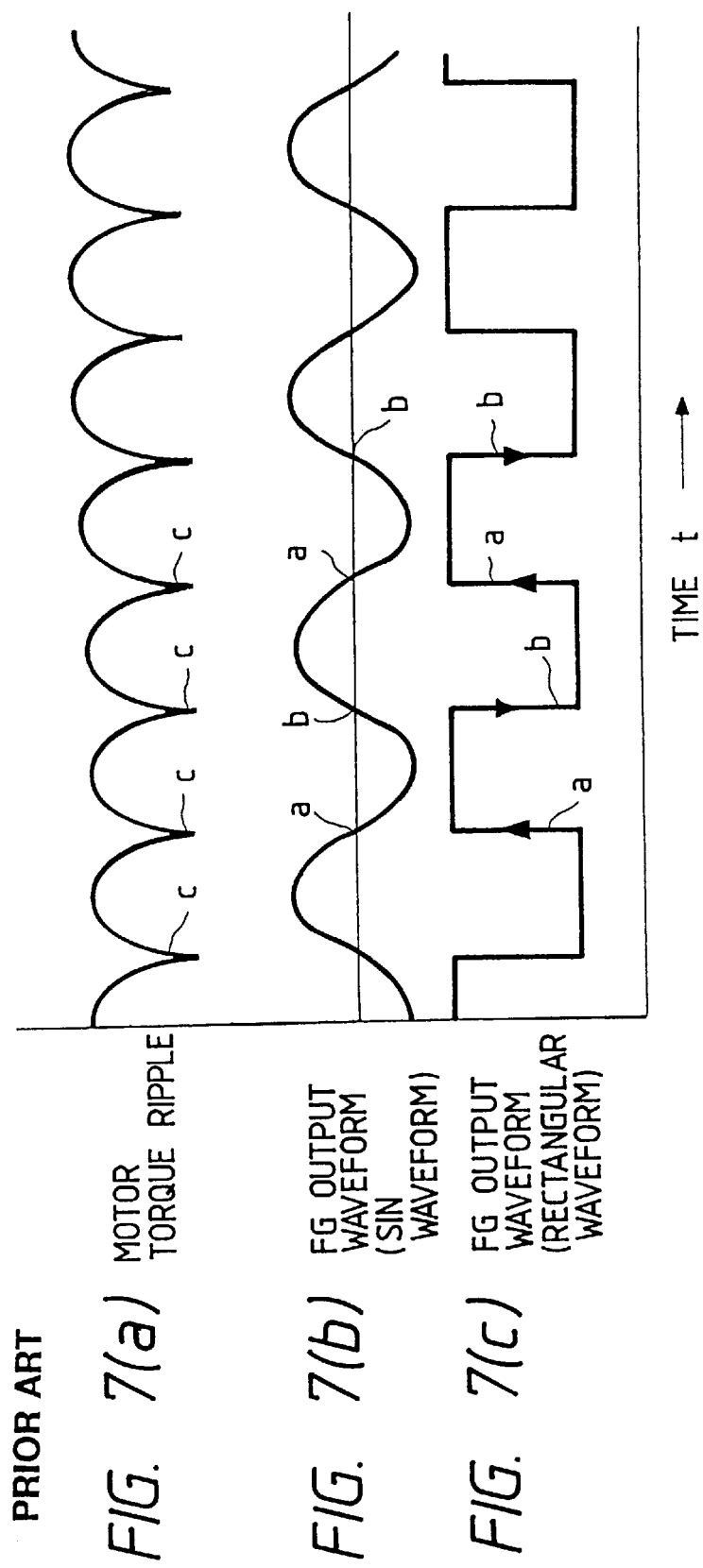

ROTATION DETECTING DEVICE FOR A BRUSHLESS MOTOR

BACKGROUND OF THE INVENTION

1. Field of the invention

The invention relates to a rotation detecting device for a brushless motor.

2. Related art

Some electric motors such as a motor for driving a rotary cylinder head of a videotape recorder (VTR), and that for driving a rotary polygon mirror of an optical scanning device are provided with a frequency generator (FG) so that the rotating speed of the driving motor is detected and the detected speed is used in the speed control.

Generally, such a frequency generator attached to a motor or the like comprises a magnetized portion for the frequency generator (hereinafter, referred to as "FG magnetized portion") which is rotated together with a rotating body such as a rotor of the motor and magnetized and arranged in the circumferential direction, and a generating coil pattern (hereinafter, referred to as "FG pattern") which opposes the FG magnetized portion.

The FG pattern is formed on a circuit board so as to have a substantially circular ring shape, and comprises a plurality of generating lines which are radially elongated, and connecting lines which connect the generating lines so as to constitute a series connection unit.

A predetermined wiring pattern is formed on the circuit board.

FIGS. 4 to 6 show an example of a conventional brushless motor.

In FIGS. 4 and 5, the reference numeral 1 designates a rotation shaft. As shown in FIG. 4, the rotation shaft 1 is rotatably supported through a bearing 4 by the bearing holder 3 which stands on a circuit board (printed-circuit board) 2. A rotor case 5 which is rotated integrally with the rotation shaft 1 and has a substantially cup-like shape is fixed to the upper end portion of the rotation shaft 1 in FIG. 4. A ring-like rotor magnet 6 is disposed on the inner peripheral face of the outer flange portion of the rotor case 5. As shown in FIGS. 4 and 6, the rotor magnet 6 comprises a driving magnet pole portion 6a in which N-poles and S-poles are alternatingly formed in the circumferential direction and which is used for driving the brushless motor, and an FG magnetized portion 6b which is disposed at the lower end of the driving magnet pole portion 6a in FIG. 4 and in which magnetic poles are alternatingly formed.

In order to facilitate the understanding of the positional relationship between the driving magnet pole portion 6a magnetized on the inner peripheral face of the rotor magnet 6, and the FG magnetized portion 6b magnetized on the lower end face, the magnetization state is shown on concentric circles in FIG. 6.

A stator core 19 is disposed at a position which opposes the inner periphery of the driving magnet pole portion 6a of the rotor magnet 6. A driving coil 10 is wound on the stator core 19. An FG pattern 7 shown in FIG. 5 is formed at a position of the circuit board 2 which opposes the FG magnetized portion 6b of the rotor magnet 6.

The rotating speed of such a brushless motor is usually controlled in the following manner. The FG pattern 7 outputs a sinusoidal FG signal (see (b) of FIG. 7). The FG signal is waveform-shaped by, for example, a waveform shaper (not shown) so as to be converted into a pulse-like FG signal shown in (c) of FIG. 7. The leading edge a or the trailing edge b of the pulse-like FG is used as a trigger. Alternatively, the sinusoidal FG signal ((b) of FIG. 7) may be used as it is. In this case, the cross point a or b of the sinusoidal FG signal and AC=0 is used as a trigger. The rotational position is controlled in a similar manner. That is, the leading edge a or the trailing edge b of the pulse-like FG, or the cross point a or b of the sinusoidal FG signal and AC=0 is used as a trigger.

However, such a rotation detecting device for detecting a rotating speed or a rotational position has the following problem.

In the case where the period of the motor torque ripple (FIG. 7(a)) coincides with that of the FG signal (FIGS. 7(b) and (c)), or the case where these periods have a mutual relationship of, for example, one-to-an even number multiplication, the minimum point c of the motor torque due to the torque ripple coincides with the leading edge a and/or the trailing edge b of the pulse-like FG (in FIG. 7, both the points a and b) (naturally, the minimum point c coincides also with the cross points a and b of the sinusoidal FG signal and AC=0). This produces a problem in that the change (reaction) of the speed of the motor in response to an input of a rotating speed control signal is delayed. When such a brushless motor is used as, for example, a motor for driving a cylinder of a VTR, particularly, the delay causes undesirable phenomena such as a color slippage and disturbance in a displayed image.

This problem arises also in the case where the leading edge a or the trailing edge b of the pulse-like FG, or the cross point a or b of the sinusoidal FG signal and AC=0 is used as a trigger of a rotational position control signal. In the case, namely, the change (reaction) of the position of the motor is delayed.

SUMMARY OF THE INVENTION

It is an object of the invention to provide a rotation detecting device for a brushless motor in which the reaction delay of the motor can be prevented from occurring.

In order to attain the object, the rotation detecting device for a brushless motor according to the first aspect of the invention is an apparatus which comprises: a stator core on which a coil is wound; a driving magnetic pole portion which opposes the stator core, which comprises a plurality of magnetic poles, and which is rotated; an FG magnetized portion which is rotated together with the driving magnetic pole portion, and which comprises a plurality of magnetic poles; and an FG pattern which opposes the FG magnetized portion, and in which relative positions of the stator core, the driving magnet pole portion, the FG magnetized portion, and the FG pattern in the circumferential direction are set so that a minimum point of a torque ripple of the brushless motor does not coincide with a point of an output signal from the FG pattern, the point functioning as a trigger of a rotation control.

In order to attain the object, the rotation detecting device for a brushless motor according to the second aspect of the invention is an apparatus which comprises: a stator core on which a coil is wound; a driving magnetic pole portion which opposes the stator core, which comprises a plurality of magnetic poles, and which is rotated; an FG magnetized portion which is rotated together with the driving magnetic pole portion, and which comprises a plurality of magnetic poles; and an FG pattern which opposes the FG magnetized portion, and in which relative positions of the stator core, the driving magnet pole portion, the FG magnetized portion, and the FG pattern in the circumferential direction are set so that a maximum point of a torque ripple of the brushless motor coincides with a point of an output signal from the FG pattern, the point functioning as a trigger of a rotation control.

In order to attain the object, the rotation detecting device for a brushless motor according to the third aspect of the invention is an apparatus in which, in addition to the configuration of the first or second aspect of the invention, the point of an output signal from the FG pattern which functions as a trigger of a rotation control is a leading edge or a trailing edge of a rectangular wave signal output from the FG pattern.

In the rotation detecting device for a brushless motor according to the first means, the relative positions of the stator core, the driving magnetic pole portion, the FG magnetized portion, and the FG pattern in the circumferential direction are set so that the minimum point of the torque ripple of the brushless motor does not coincide with a point of an output signal from the FG pattern, the point functioning as a trigger of a rotation control. Therefore, the motor is prevented from delaying in reaction in response to an input of a rotation control signal.

In the rotation detecting device for a brushless motor according to the second means, the relative positions of the stator core, the driving magnetic pole portion, the FG magnetized portion, and the FG pattern in the circumferential direction are set so that the maximum point of the torque ripple of the brushless motor coincides with a point of an output signal from the FG pattern, the point functioning as a trigger of a rotation control. Therefore, the reaction of the motor in response to an input of the rotation signal can be prevented from delaying, in a more effective manner than the first means.

BRIEF DESCRIPTION OF THE DRAWINGS

FIGS. 7(a) to (c) are waveform chart showing the relationship between the motor torque ripple and the FG pattern output in the conventional art.

DETAILED DESCRIPTION OF THE PREFERRED EMBODIMENTS

Hereinafter, embodiments of the invention will be described with reference to the drawings.

Figure 1:
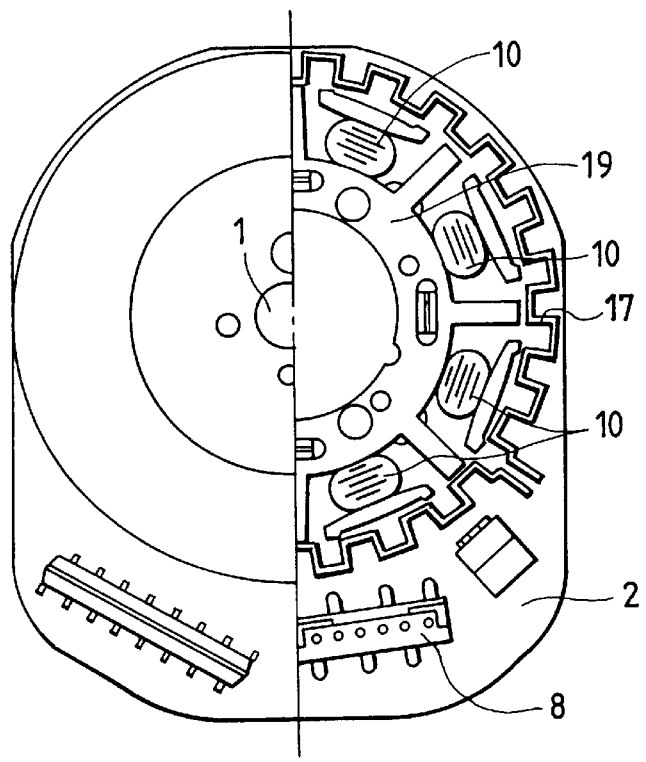
FIG. 1 is a partially fragmentary plan view of a rotation detecting device for a brushless motor showing an embodiment of the invention.

FIG. 1 is a partially fragmentary plan view of a rotation detecting device for a brushless motor showing an embodiment of the invention. FIG. 1 corresponds to FIG. 5 which has been described in the prior art paragraph. The components identical with those used in the prior art example are designated by the same reference numerals. In order to eliminate duplication of description, the description of these components is omitted.

Figure 5:
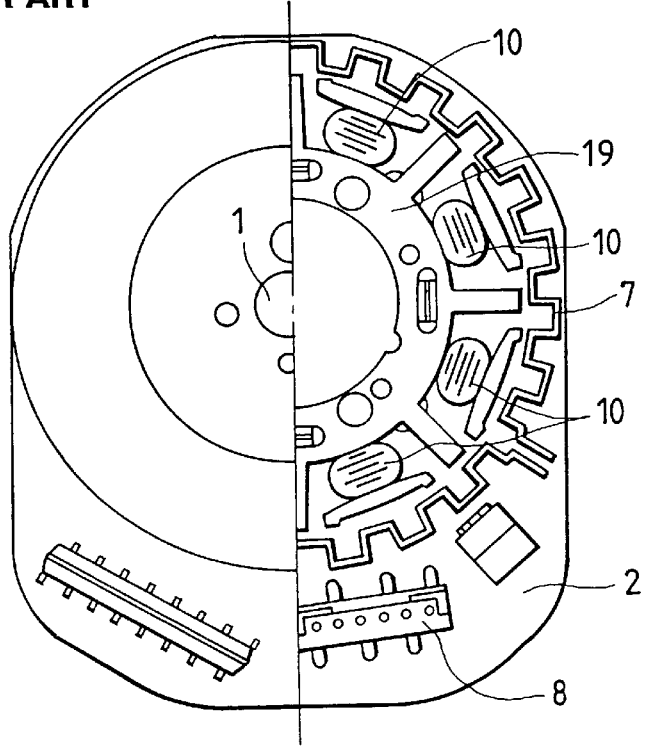
FIG. 5 is a partially fragmentary plan view of the rotation detecting device for a brushless motor shown in FIG. 4.

The brushless motor in the embodiment is used as a motor for driving a cylinder of a VTR in the same manner of the prior art example. The rotation detecting device for a brushless motor of the embodiment is different from the prior art example in the following point. That is, an FG pattern which has a similar configuration as that of the FG pattern 7 shown in FIG. 5 is located by being rotated or shifted in the circumferential direction by a predetermined angle with respect to the core slots of a stator core 19. The shifted FG pattern 17 causes the FG phase (FIGS. 3(b) and (c)) to be shifted by ¼ of the period with respect to that shown in FIGS. 7(b) and (c).

Figure 3:
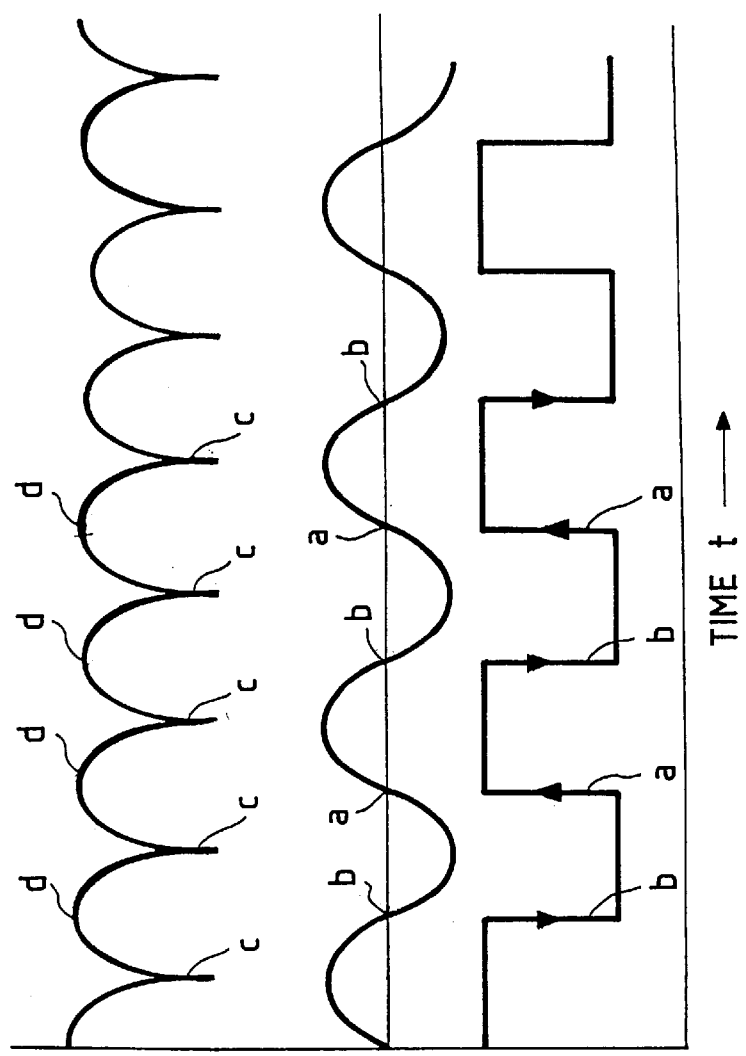
FIGS. 3(a) to (c) are waveform chart showing the relationship between the motor torque ripple and the FG pattern output.
Figure 4:
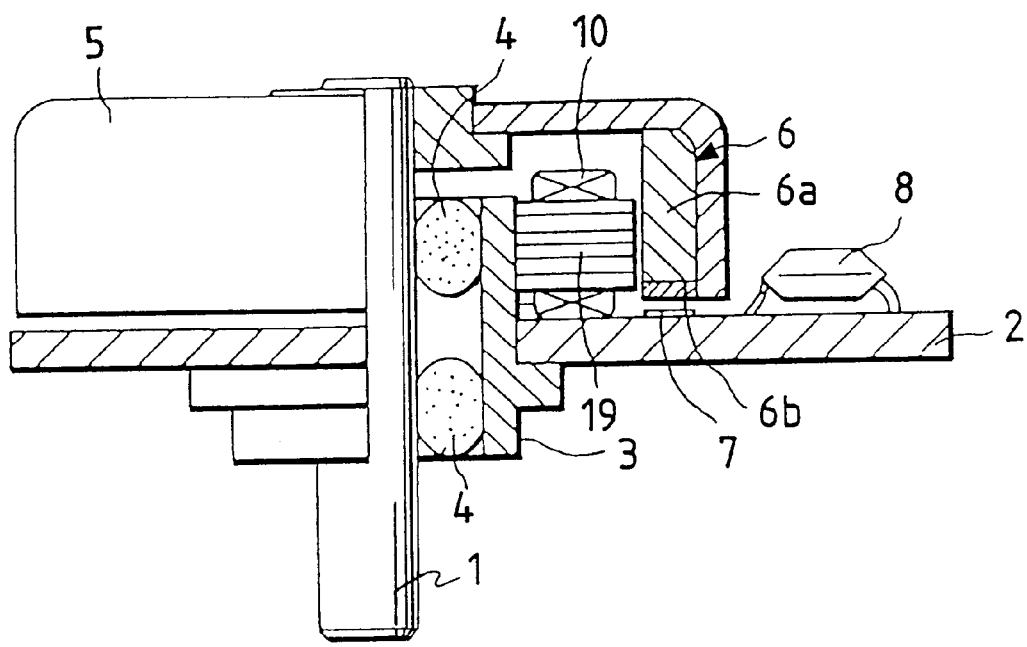
FIG. 4 is a partially sectional front view of a rotation detecting device for a brushless motor which shows the prior art.

Therefore, the motor torque ripple and the waveform of the FG pattern output establish the mutual relationship shown in FIG. 3. In other words, the maximum point d of the torque ripple of the brushless motor coincides with points a and b of an output signal from the FG pattern which function as a trigger of a rotating speed control. Therefore, the motor conducts very rapidly the speed change (reaction) in response to an input of a rotating speed control signal, so that the time required for changing the speed is minimized. Consequently, a color slippage and disturbance in a displayed image can be prevented from occurring.

Also in the case where the points a and b are used as a trigger of a rotational position control by using. the output signal from the FG pattern, it is possible to attain the same effect, i.e., that the reaction of the motor in response to an input of a rotational position signal is prevented from delaying.

Figure 2:
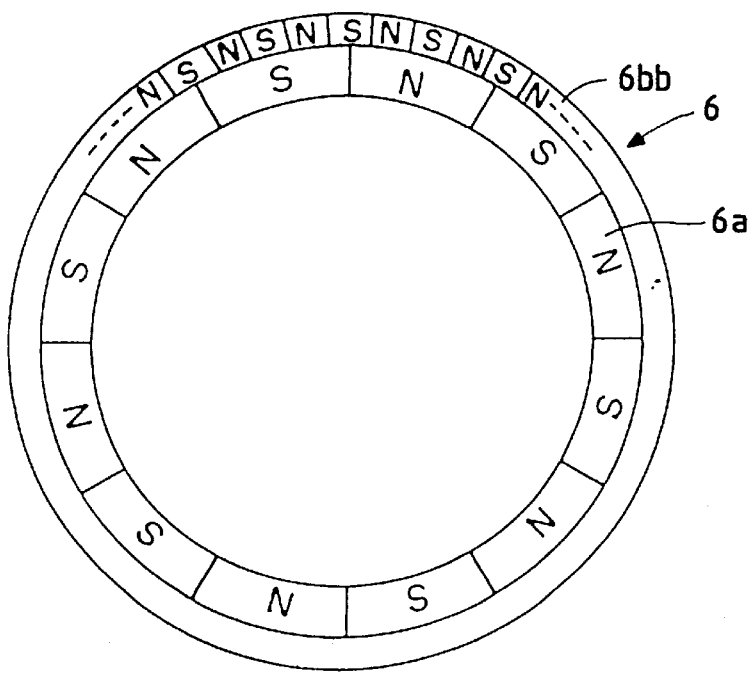
FIG. 2 is a diagrammatic plan view of a rotor magnet used in a rotation detecting device for a brushless motor which shows another embodiment of the invention.

FIG. 2 is a diagrammatic plan view of a rotor magnet used in a rotation detecting device for a brushless motor which shows another embodiment of the invention. FIG. 2 corresponds to FIG. 6 which has been described in the prior art paragraph.

Figure 6:
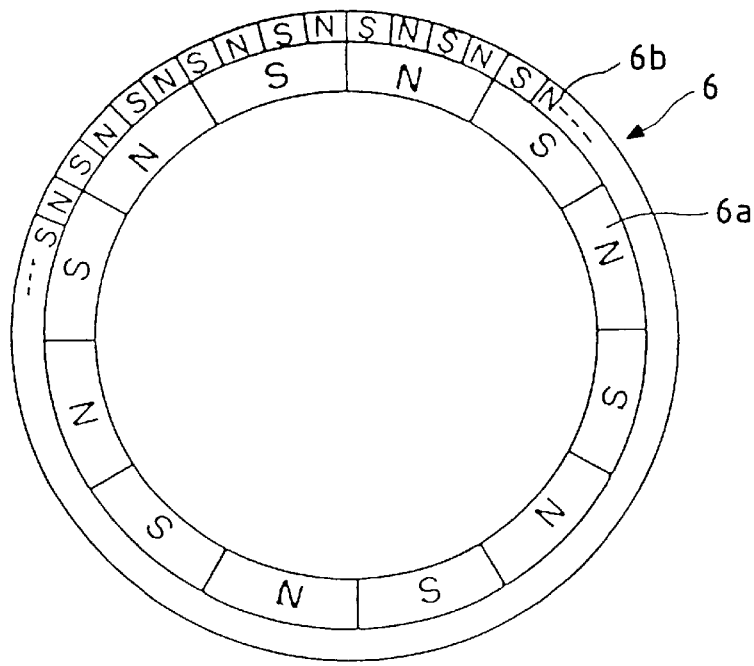
FIG. 6 is a diagrammatic plan view of a rotor magnet used in the rotation detecting device for a brushless motor shown in FIGS. 4 and 5.

The rotation detecting device for a brushless motor of the embodiment is different from the prior art example in that an FG magnetized portion having a similar configuration as that of the FG magnetized portion 6b shown in FIG. 6 is located by being rotated or shifted in the circumferential direction by a predetermined angle with respect to the position of the driving magnet pole portion 6a. The shifted FG magnetized portion 6bb causes the FG phase (FIGS. 3(b) and (c)) to be shifted by ¼ of the period with respect to that shown in FIGS. 7(b) and (c).

Also this configuration can attain the same effect as that of the aforementioned embodiment.

Although the invention conducted by the inventor has been specifically described on the basis of embodiments, the invention is not restricted to these embodiments. It is a matter of course that various modifications can be done without departing from the spirit of the invention. In the embodiments described above, the position of the FG pattern or the FG magnetized portion in the circumferential direction is changed so that the FG phase (FIGS. 3(b) and (c)) is shifted by ¼ of the period with respect to that shown in FIGS. 7(b) and (c). Alternatively, the stator core 19 or the driving magnet pole portion 6a may be located so as to be rotated or shifted in the circumferential direction in the same manner as the embodiments, whereby the FG phase (FIGS. 3(b) and (c)) is shifted by ¼ of the period with respect to that shown in FIGS. 7(b) and (c). In summary, at least one of the FG pattern, the FG magnetized portion, the stator core, and the driving magnet pole portion may be located by being rotated or shifted in the circumferential direction so that the FG phase is shifted by ¼ of the period.

In the embodiments, the particularly effective configuration is employed in which the FG phase (FIGS. 3(b) and (c)) is shifted by ¼ of the period with respect to that shown in FIGS. 7(b) and (c) and the maximum point d of the torque ripple of the brushless motor coincides with points a and b of an output signal from the FG pattern which function as a trigger of a rotation control. The shift amount is not restricted to ¼ of the period. In summary, the minimum point c of the torque ripple of the brushless motor does not coincide with points a and b of an output signal from the FG pattern which function as a trigger of a rotation control. Also in this configuration, as compared with the prior art, the delay of the reaction of the motor in response to an input of the rotation signal can be improved.

In the above description, the invention is applied to a cylinder motor of a VTR. Of course, the invention can be applied to a motor other than a cylinder motor of a VTR.

As described above, according to the rotation detecting device for a brushless motor, the relative positions of the stator core, the driving magnet pole portion, the FG magnetized portion, and the FG pattern in the circumferential direction are set so that the minimum point of the torque ripple of the brushless motor does not coincide with a point of an output signal from the FG pattern which functions as a trigger of a rotation control. Therefore, the reaction of the motor in response to an input of a rotation control signal can be prevented from delaying.

According to the rotation detecting device for a brushless motor, the relative positions of the stator core, the driving magnet pole portion, the FG magnetized portion, and the FG pattern in the circumferential direction are set so that the maximum point of the torque ripple of the brushless motor coincides with a point of an output signal from the FG pattern which functions as a trigger of a rotation control. Therefore, the reaction of the motor in response to an input of a rotation control signal can be prevented from delaying, in a more effective manner than the invention mentioned above.

What is claimed is:

1. A rotation detecting device for a brushless motor, comprising:

a stator core on which a coil is wound;

a driving magnetic pole portion opposing said stator core, the driving magnetic pole portion including a plurality of magnetic poles, and being rotated;

an FG magnetized portion rotated together with said driving magnetic pole portion, the FG magnetized portion including a plurality of magnetic poles; and an FG pattern opposing said FG magnetized portion, wherein relative positions of said stator core, said driving magnet pole portion, said FG magnetized portion, and said FG pattern in a circumferential direction are set so that a minimum point of a torque ripple of said brushless motor always occurs at a different time than a point of an output signal from said FG pattern, said point of said output signal functioning as a trigger for rotation control.

2. A rotation detecting device for a brushless motor, comprising:

a stator core on which a coil is wound;

a driving magnetic pole portion opposing said stator core, the driving magnetic pole portion including a plurality of magnetic poles, and being rotated;

an FG magnetized portion rotated together with said driving magnetic pole portion, the FG magnetized portion including a plurality of magnetic poles; and an FG pattern opposing said FG magnetized portion, wherein relative positions of said stator core, said driving magnet pole portion, said FG magnetized portion, and said FG pattern in a circumferential direction are set so that a maximum point of a torque ripple of said brushless motor always occurs at the same time as a point of an output signal from said FG pattern, said point of said output signal functioning as a trigger for rotation control.

3. A rotation detecting device for a brushless motor according to claim 1, wherein said point of an output signal from said FG pattern which functions as a trigger for rotation control is one of a leading edge and a trailing edge of a rectangular wave signal output from said FG pattern.

4. A rotation detecting device for a brushless motor according to claim 2, wherein said point of an output signal from said FG pattern which functions as a trigger for rotation control is one of a leading edge and a trailing edge of a rectangular wave signal output from said FG pattern.

* * * * *